United States Patent [19]
Hinden et al.

[11] 4,031,350
[45] June 21, 1977

[54] METHOD OF RESISTANCE WELDING

[75] Inventors: Milton Hinden, Massapequa; Charles Giannone, North Babylon, both of N.Y.

[73] Assignee: Duro-Dyne Corporation, Farmingdale, N.Y.

[22] Filed: Sept. 5, 1975

[21] Appl. No.: 610,640

[52] U.S. Cl. .................................... 219/99; 85/11
[51] Int. Cl.² ................................ B23K 11/04
[58] Field of Search ............ 219/98, 99; 85/11, 13, 85/17; 52/758 B

[56] References Cited
UNITED STATES PATENTS

| | | | |
|---|---|---|---|
| 1,774,867 | 9/1930 | Booth | 85/13 |
| 3,373,646 | 3/1968 | Ehlert | 85/17 |
| 3,701,878 | 10/1972 | Hinden | 219/85 |
| 3,741,068 | 6/1973 | Andruskiewicz | 85/11 |

FOREIGN PATENTS OR APPLICATIONS

| | | | |
|---|---|---|---|
| 1,208,110 | 2/1960 | France | 85/11 |

*Primary Examiner*—E. A. Goldberg
*Attorney, Agent, or Firm*—Mark T. Basseches; Paula T. Basseches

[57] ABSTRACT

The present invention is directed to an improved integral sheet metal welding pin particularly adapted for use with automatic welding machines of the type in which pins are stored in random fashion in a hopper. The pin incorporates a shank adapted to be attached by resistance welding to sheet metal ducting, and includes an enlarged head spaced from the duct and adapted to press insulation against the duct. The improved pin is characterized by an elongated tongue portion struck from the head of the pin and lying in parallel spaced relation to the shank, the configuration of the tongue and its location being such as to prevent stacking or nesting of weld pins in a manner which would preclude their being separated for automatic feeding, the tongue also serving as a stop in the course of welding, to preclude over-melting of the shank or damaging of the insulation.

1 Claim, 4 Drawing Figures

METHOD OF RESISTANCE WELDING

BACKGROUND OF THE INVENTION

1. Field of the Invention

The present invention is in the field of resistance welding pins of the type used to hold a fibrous insulating batt to the surface of ducting used in air conditioning, heating, and like air conduit installations.

2. The Prior Art

The present invention is directed to an improved welding in fabricated of sheet metal, and more particularly to an improved version of the welding pin disclosed in U.S. Pat. No. 3,701,878.

In the noted patent there is shown a sheet metal resistance welding pin which may be stacked or nested in compact fashion, the pins being disposed in a shingled relationship in the stacked condition, e.g. the head and shank portions of adjacent pins are in abutting and slightly laterally offset relation. In U.S. Pat. No. 3,762,541 there is disclosed mechanism for supporting in stacked or nested position and serially feeding the welding pins of U.S. Pat. No. 3,701,878.

Certain types of known feeding and orienting apparatuses incorporate hoppers and selector mechanisms for serially removing randomly positioned individual articles one at a time and feeding the same in a predetermined desired orientation to an apparatus for further processing the same, e.g. to a welding head. It is important to the satisfactory operation of such feeding apparatuses that the articles to be extracted from the hopper be capable of ready separation. The welding pins in accordance with U.S. Pat. No. 3,701,878 are not ideally suited for use with hoppers of the type described in view of the tendency of such pins to stack and wedge together or stick in the stacked position. Stacked pins cannot be fed or, in some instances, may be fed several at a time, resulting in improper affixation.

SUMMARY

The present invention may be summarized as directed to an improved sheet metal resistance welding pin of the type shown in U.S. Pat. No. 3,701,878, the pin incorporating a depressed tongue member struck from the head portion thereof and extending downwardly in parallel spaced relation to the shank. The depressed tongue functions to prevent stacking or nesting of the pins in a manner which would prevent their readily being separated in the hopper of an automatic feeding machine. Additionally, the tongue may serve as the means or an auxiliary means for preventing over-melting or over-bending of the shank in the course of forming a resistance weld, with consequent damage to the insulation.

Accordingly, it is an object of the present invention to provide an improved resistance welding pin.

It is a further object of the invention to provide a resistance welding pin which may be loaded into the hopper of an apparatus for one at a time extraction therefrom for feeding in oriented position to the weld head or electrode of a resistance welding machine, the pins being characterized by freedom from a tendency to stack, nest or telescope in such manner that they may not be singly extracted by the orienting apparatus.

Still a further object of the invention is the provision of a welding pin of the type described, including in addition to the usual shank offset from the plane of the head, a tongue or stop member likewise displaced from the plane of the head in such manner that two adjacent pins may not be stacked with their heads in contacting position.

Still a further object of the invention is the provision of a welding pin of the type described, including a tongue in parallel spaced relation to the attachment shank, the tip of the shank being displaced from the plane of the head a distance somewhat greater than the displacement of the end of the tongue, whereby the tongue, in addition to precluding stacking, prevents shifting movement of the insulation and duct, and further serves, in the course of attachment, to prevent over-melting of the shank, with consequent crushing of the insulation.

To attain these objects and such further objects as may appear herein or be hereinafter pointed out, reference is made to the accompanying drawings, forming a part hereof, in which.

Figure 1:
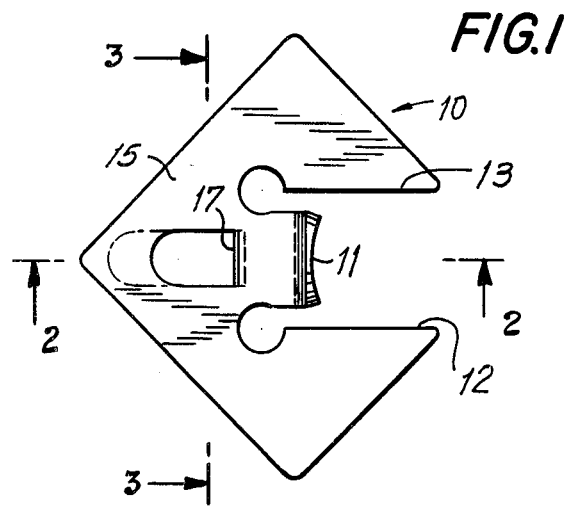
FIG. 1 is a top plan view of a welding pin in accordance with the invention.

In accordance with the invention, there is shown in FIG. 1 a resistance welding pin 10 fabricated from a blank of sheet metal of essentially square shape. As more fully described in U.S. Pat. No. 3,701,878, owned by the assignee of the instant application, the pin may advantageously be made of a square blank of sheet metal, such as sheet steel.

The pin includes an integral shank portion 11, the shank being preferably formed or defined by a pair of parallel cuts or slits 12, 13, running parallel to a diagonal of the square.

A sharpened tip 14 is formed on the end of the shank 11 remote from the head 15. As more fully explained in U.S. Pat. No. 3,701,878, the tip 14 is extremely sharp in order to permit the pin to be passed through a batt or mass 16 of fibrous insulation, such as glass wool or the like which is maintained in a somewhat compacted condition by resinous binders, as is well known.

While the typical insulation material 16 is soft and, hence, readily punctured by the shank 11 of the welding pin, there would normally exist a tendency for glass or like fibrous material to be picked up by the tip portion 14 in the course of insertion of the pin through the insulation. Obviously, where the tip is wholly or partially covered by insulation material, the likelihood of formation of good electrical contact and a consequent satisfactory weld is reduced.

In accordance with U.S. Pat. No. 3,701,878, the tip is sharpened to facilitate insertion into good electrical contact and rapid welding of the tip, and such sharpened tip is also embodied in the instant welding pin.

The pins in accordance with U.S. Pat. No. 3,701,878 are susceptible of being intimately stacked in shingled relation — for instance, see FIG. 2, and U.S. Pat. No. 3,762,541. It has been determined that where two or more pins are stacked in the manner shown in FIG. 2 of U.S. Pat. No. 3,701,878 and the head portions thereof are in abutting relationship, there is a tendency for the pins to wedge or remain in the stacked or nested position. Accordingly, a relatively high incidence of failures has been observed in attempting to extract such pins one at a time, using conventional feeders incorporating bulk hoppers.

The problem arises as a result of the nested pins either jamming in and not exiting from the feed mechanism or from a series of pins exiting simultaneously in stacked relation. In the latter case, it often occurs that two or more pins are advanced by the welding electrode through the insulation material and, upon completion of the welding circuit, an imcomplete fusion of the shank to the duct occurs. An incompletely fused connection is of little strength and fails to augment the attachment of the insulation to the duct, which is often initially fixed in position by an adhesive.

In accordance with the present invention, the welding pin is provided with a tongue 17 which is struck from the metal of the head portion 15. The tongue 17 is disposed in parallel spaced relation to the shank 11 and terminates in a blunt end portion 18, which may be arcuate — see FIG. 3, or may be flat.

Figure 2:
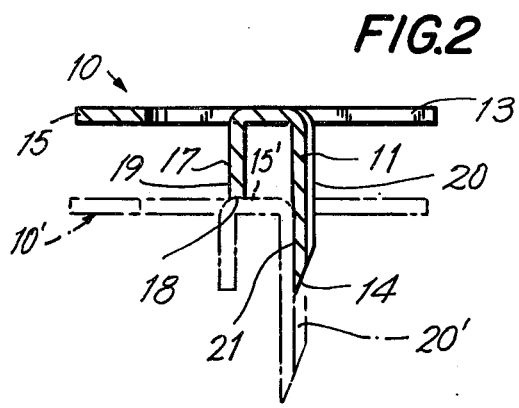
FIG. 2 is a section taken on the line 2—2 of FIG. 1.
Figure 3:
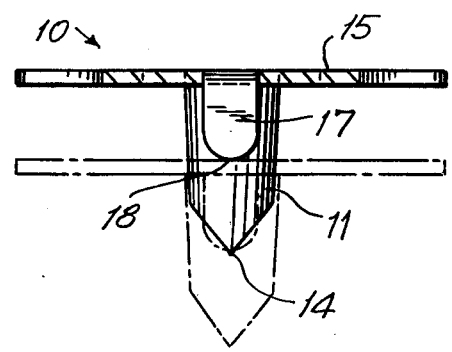
FIG. 3 is a section taken on the line 3—3 of FIG. 1.

A principal function of the tongue 17 is to prevent stacking of the pins with their heads in close adjacency — see FIGS. 2 and 3. Non-stacking is the result of the fact that the spacing of the outermost portions 19 and 20 of the tongue and shank is such that when an innermost face 21 of a shank lies against an inner surface 20' of a second and identical pin directly therebeneath, the end portion 18 of the tongue will engage a solid head portion 15' of the pin 10'. The offset relationship of the tongue and head is occasioned by the thickness of the metal of the shank, throwing the tongue of the upper pin out of registry with the slot defining the tongue.

The only orientation of adjacent pins wherein the head portions may be disposed in close adjacency are:

a. if the shanks are arrayed in opposite directions, i.e. the pins touch head to head, with the shanks diverging; or b. if the shank of one pin extends into the space defined between the slots 12, 13 and the tongues 17 are spaced apart, i.e. one of the pins as depicted in FIG. 2 is rotated 180° about the longitudinal axis of the shank 11.

It will be observed that in either of the positions (a) or (b), the pins may be readily separated without fear of wedging into engagement with each other.

In the case of the (a) position, the pins naturally separate on tumbling or vibration of the hopper. In the (b) position, the pins are likewise readily separated since the spacing of the slits 12, 13 is substantially greater than the transverse dimension of the shank 11.

The depressed tongue 17 may perform a further important function in the course of welding, notably, to preclude undue foreshortening of the shank during welding, with consequent crushing of the insulation material disposed between the duct and the head 15 of the pin. Such function of the tongue will be explained further hereinbelow.

In the course of welding, it will be appreciated that the duct component 22 is normally associated with a ground electrode whereas the head 15 is associated with the "hot" electrode. As the tip 14 of the shrank is brought into contact with the duct 22 and the welding circuit energized, the electrical flow and heat build-up, which is preferably centered at the tip area of the pin, will cause the tip 14 to melt and will cause portions of the shank immediately adjacent the tip to become heated to a degree at which it is extremely malleable. As the welding electrode continues to be advanced toward the duct 22, if the shank portion adjacent the tip has become liquefied or softened, it will thus provide little resistance to continued advance of the head toward the duct, such advance of course being accompanied by a melting of the shank or a bending of the overheated component thereof. As soon, however, as the end 18 of the tongue 17 engages against the duct, the tongue 17, which has not been heated except by conduction, forms both a mechanical stop and an electrical shunt defining an alternate current path between the electrodes. The shunting effects of the tongue 17 will thus immediately reduce the current flow through the shank accompanied by rapid dropping of the temperature in the weld area.

Figure 4:
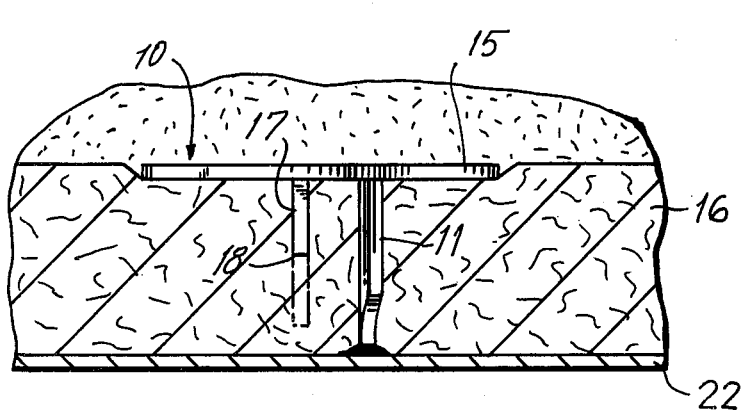
FIG. 4 is a sectional view of a welding pin attached to a duct.

It will thus be seen that the tongue 17 functions to provide an improved welding pin by preventing stacking in the course of feed to the welding head, and preventing undue foreshortening of the shank in the course of welding, with consequent crushing of the insulation. It will be readily recognized from an inspection of the dotted lines, FIGS. 1 and 4, that the amount by which the tongue 17 projects below the head 15 may be varied as desired, in accordance with the results to be achieved.

For instance, the shank 11 and the tongue 17 may be correlated such that the shank extends only a fraction of an inch below the tongue, thereby severely limiting the length of the shank which may be melted or bent. Alternately, a substantial length differential may be provided whereby the mechanical blocking effects of the tongue will come into play only if a drastic foreshortening, bending or over-melting of the shank is experienced.

It should be recognized that in normal operation, the principal control over undue foreshortening of the shank is effected by adjustment of the electrode feed position or mechanism. However, in many instances, i.e. where the duct material includes seams, areas of multiple thickness, etc., the position of which may be obscured by the covering insulation material, the tongue provides an automatic control feature which, to a degree, augments the control provided by preset adjustments to the machine.

It will also be appreciated that the lowered resistance resulting from the tongue contacting the duct surface may be sensed and used as a means for triggering retractile movement of the actuator cylinder or other means employed to advance the pins toward the duct.

From the foregoing it will be observed that through the addition of the tongue member, there is provided an improved welding pin which will prevent nesting and thereby increase the utility of known hopper feeding devices.

Additionally, the length of the tongue may be coordinated with the length of the shank in such manner that the tongue functions automatically to prevent overshortening of the shank.

Having thus described the invention and illustrated its use, what is claimed as new and is desired to be secured by Letters Patent is:

1. The method of attaching insulation to a sheet metal duct or the like utilizing a resistance welding pin, said welding pin being comprised of an integrally formed sheet metal blank including a head and a shank, said shank being bent at right angles to said head and including a sharpened tip disposed to one side of the plane of said head, a depending tongue portion formed from said blank, said tongue portion being disposed in parallel spaced relation to said shank and terminating in an end portion located to the same side of said plane as said shank, the spacing of said tip from said plane being greater than the spacing of said end of said tongue portion from said plane by a predetermined distance, comprising the steps of passing said shank of said pin through said insulation until said tip engages against said duct, connecting said head to one electrode of a welding transformer and said duct to the other electrode thereof, causing a welding current to flow through said shank while urging said shank toward said duct progressively to melt said tip and portions of said shank adjacent said tip to effect a welded connection between said shank and said duct, and interrupting the flow of said welding current through said shank at a point not later than when said tongue portion engages said duct, said tongue portion providing a limit stop and an alternate current path for said welding current, whereby only a limited length of said shank portion may be melted.

* * * * *